June 18, 1935.  E. B. GARY ET AL  2,005,581
COMBINATION WINDSHIELD WIPER AND HEATER
Filed Oct. 8, 1930   3 Sheets-Sheet 3
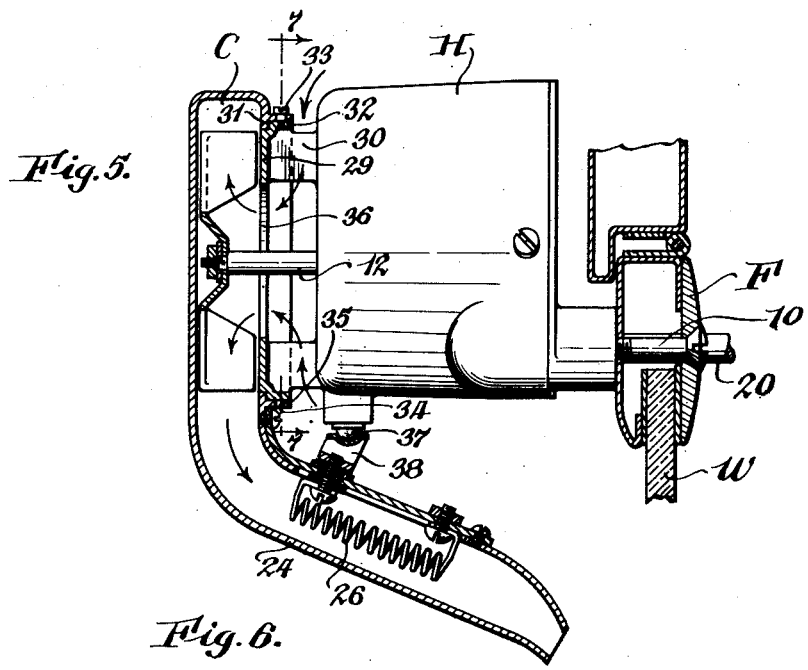
Fig. 5.
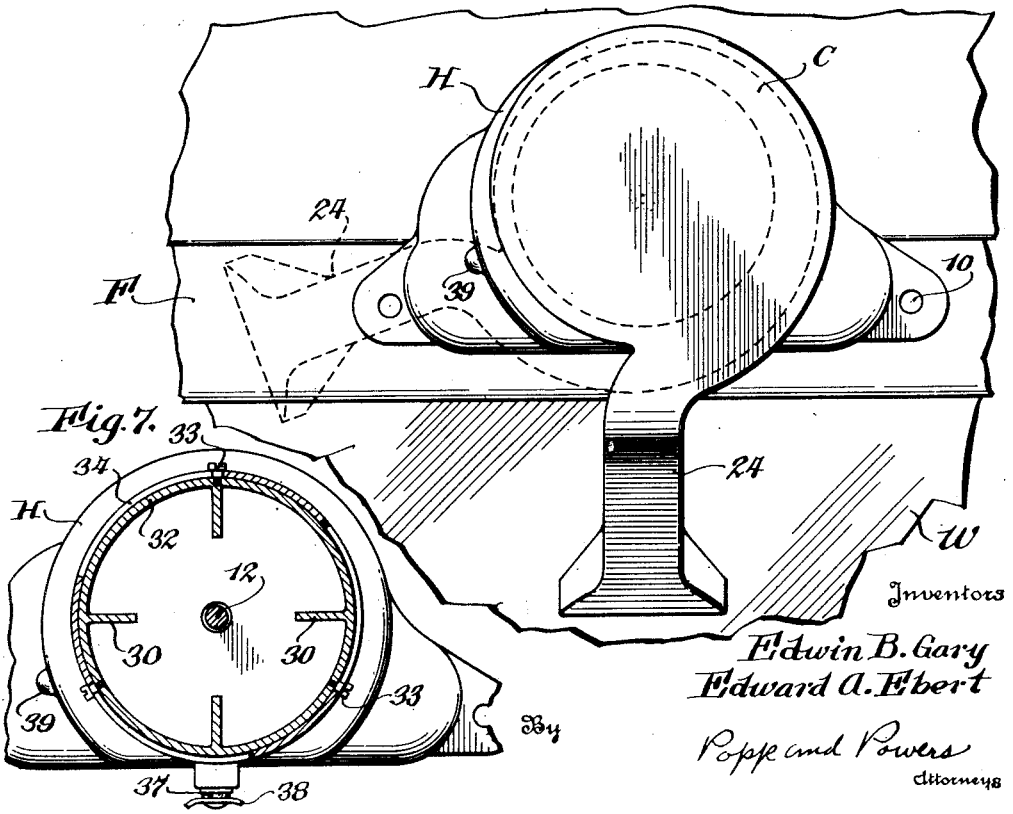
Fig. 6.
Fig. 7.
Inventors
Edwin B. Gary
Edward A. Ebert
By Popp and Powers
Attorneys Patented June 18, 1935

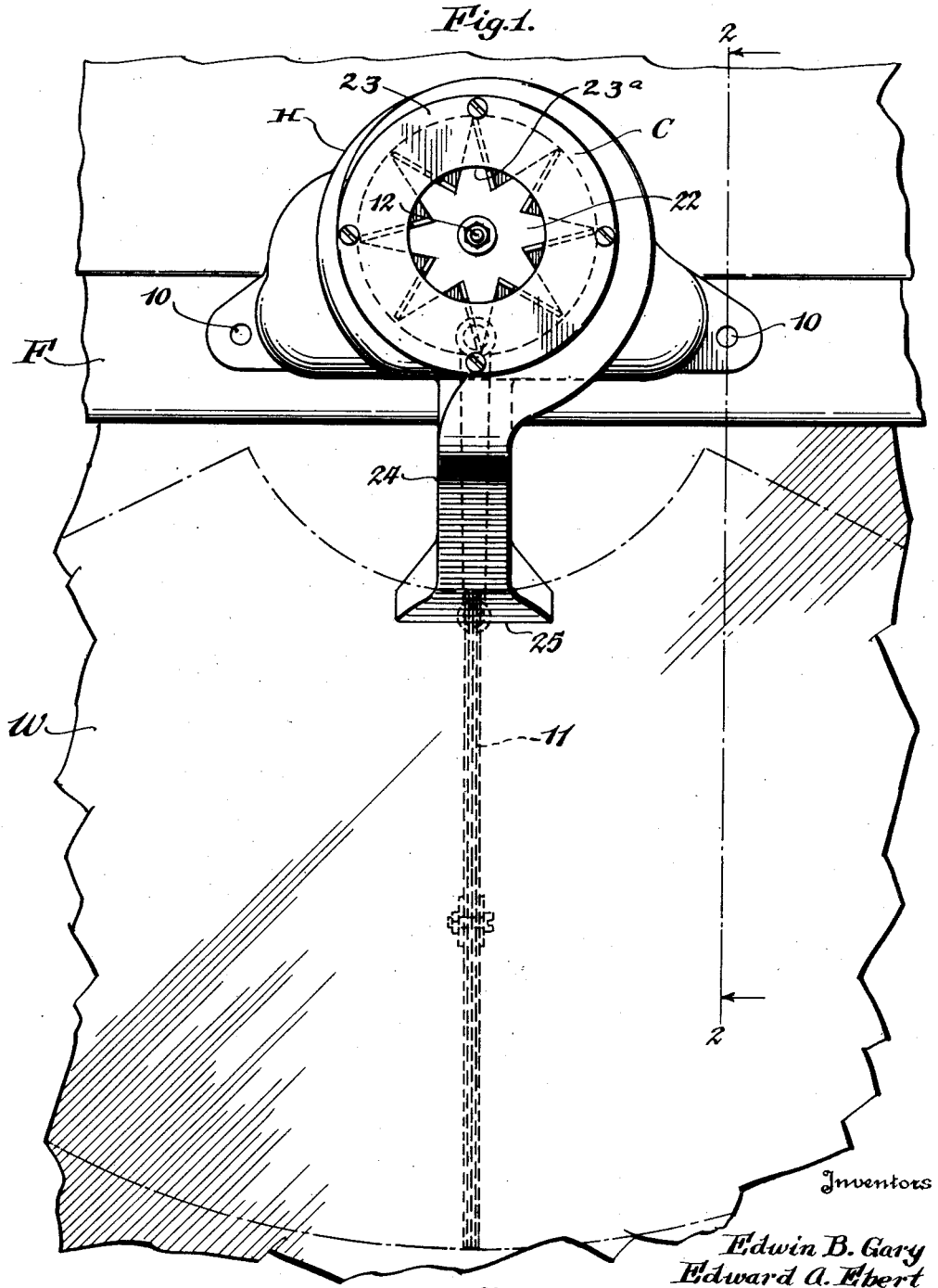

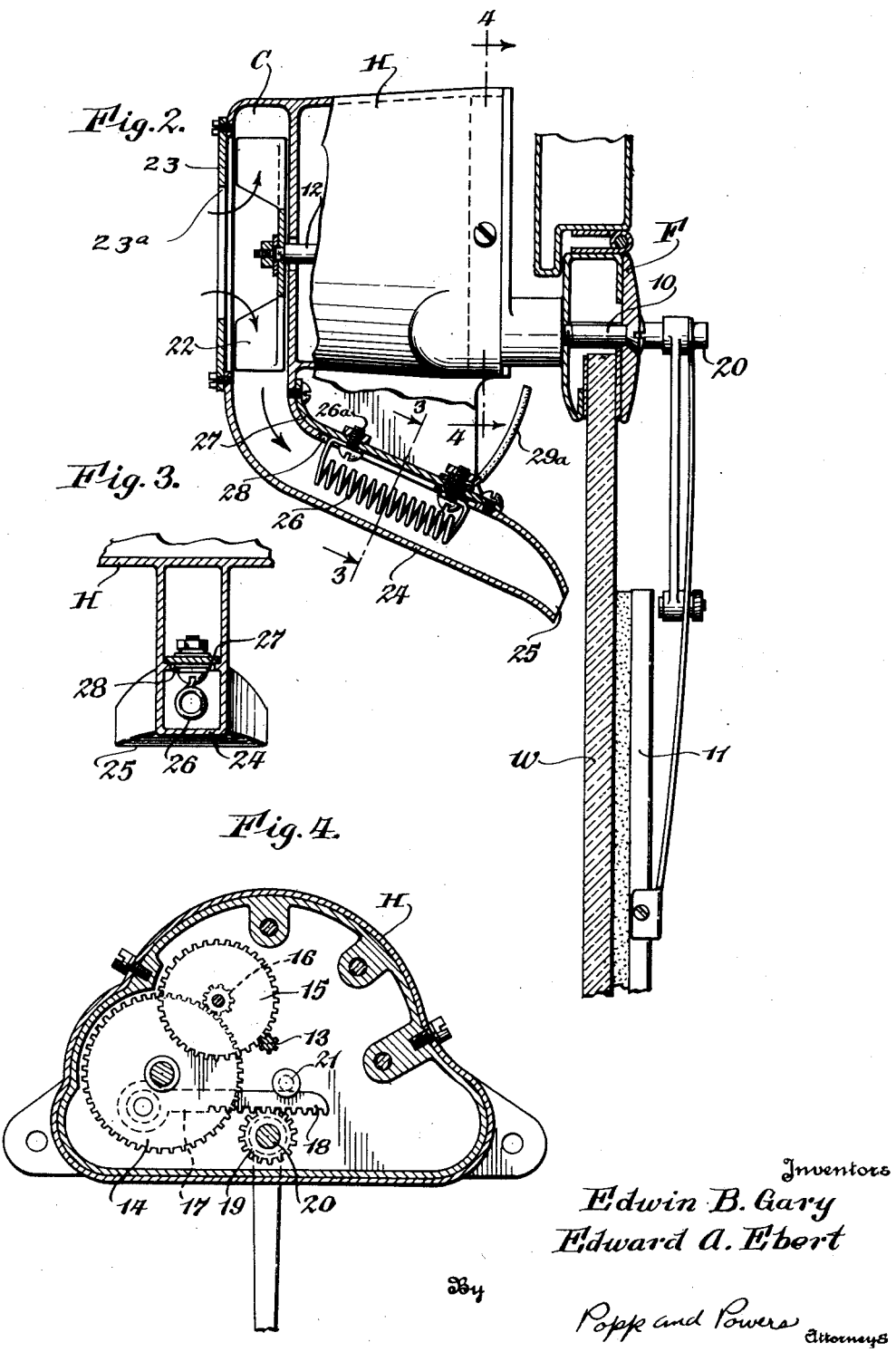

2,005,581

UNITED STATES PATENT OFFICE 2,005,581

COMBINATION WINDSHIELD WIPER AND HEATER

Edwin B. Gary and Edward A. Ebert, Buffalo, N. Y.

Application October 8, 1930, Serial No. 487,216

10 Claims. (Cl. 219—19)

This invention relates to a combination windshield heater and cleaner.

One object of the invention is to provide a device of the character described in which provision is made for heating that portion of the windshield which is traversed by the wiper so as to prevent the formation of congealed or frozen material upon the windshield in the normal line of vision of the operator of the vehicle.

Another object is to provide a device of this kind which does not extend into the line of vision of the operator so as to obstruct his view.

A further object is a device in which the air current creating and heating means is movable, when heating of the windshield is unnecessary, to a position wholly above the transparent portion of the windshield.

A further object is a device in which the casing for the air current creating and heating means is adapted when moved to an operative position to close a circuit through the heating element so that it may be connected to power when the electric motor of the device is connected to power.

A further object is to provide a compact device which is simple in construction and which makes use of the motor by which the wiper is operated.

The invention is illustrated in the accompanying drawings in which:—

Figure 1 is a fragmentary elevation of an automobile windshield showing applied thereto a combination windshield heater and cleaner constructed in accordance with the invention.

Figure 2 is a section along line 2—2 of Figure 1 showing a side elevation of the device, parts of which are broken away.

Figure 3 is a detail section taken alone line 3—3 of Figure 2.

Figure 4 is a section taken along line 4—4 of Figure 2, showing the gearing by which an oscillatory movement is imparted to the wiper.

Figure 5 is a view similar to Figure 2 showing a modified form of device.

Figure 6 is a view in elevation of the same.

Figure 7 is a section taken along line 7—7 of Figure 5.

The device, as shown in Figure 1, comprises a housing H which is attached by means of stud bolts 10 to the frame F of a windshield W, it being understood, of course, that the device may be attached to any part of the vehicle desired.

An electric motor of any conventional type is contained in the housing H and is adapted to oscillate the wiper 11 against the windshield W. This may be accomplished in any suitable manner. As shown one end of the armature shaft 12 is formed to provide a gear 13. This gear is designed to effect rotation of a gear 14 through reducing gears 15 and 16. A connecting rod 17 is connected to the gear 14 and as the latter is rotated by the motor a reciprocatory movement is imparted thereto. The said connecting rod 17 is formed along its lower edge with teeth to provide a gear rack 18. The said gear rack meshes with a gear 19 which is fixed to a short shaft 20 upon the outer end of which the wiper 11 is mounted. Thus, as the armature shaft rotates, the wiper 11 is oscillated in contact with the windshield W, the roller 21 maintaining the cooperating relation between the gear rack 18 and the gear 19.

In order to prevent the formation of frozen or congealed material upon the windshield beneath the wiper which the latter would be unable to remove, we provide means for heating that portion of the windshield which is traversed for cleaning during the operation of the wiper.

For this purpose, the housing H is formed to provide, adjacent the inner end of the motor, a fan casing C. A fan 22 is mounted in this casing upon the end of the motor shaft 12. Thus, when the wiper 11 is oscillated, the fan 22 is rotated. During its operation the fan 22 draws air in through an inlet opening 23a which is formed in a cover plate 23, the latter being secured to the open end of the casing. This air is forced in a current or blast through a pipe 24 by which it is directed against the windshield W behind the wiper 11, it being noted that the nozzle 25 of the pipe is designed to spread the air over a substantial area of the windshield.

In its passage through the pipe 24 the air blast or current is heated by a resistance element 26 to a temperature which is high enough for the purpose in view. As the hot air impinges against the windshield it flattens out fan shape to warm a relatively large area thereof and thus prevents the formation of snow or ice with which the wiper alone would be unable to cope.

The heating element, as shown, is mounted upon a plate 27 which is suitably secured to the pipe 24 so that the element 26 extends through an opening 28 thereof into the approximate center of the path traversed by the current of air during its passage toward the windshield. One end of the element is grounded to this plate as at 26a, and hence the frame of the vehicle, and the other end may be suitably insulated from the said plate and connected to a suitable switch, not shown, by a lead wire 29a. By mounting the resistance element in this manner, it may be easily assembled in the pipe as well as removed for repair or replacement.

In the modified form of the invention shown in Figures 5, 6 and 7, means is provided whereby the casing C may be rotated to move to pipe 24 to the position shown in dotted lines in Figure 6. To this end, the casing C is formed independent of the motor housing H. It is, however, supported by the latter. The said housing, therefore, is formed with a supporting plate 29 which is spaced from the rear end of the motor housing by spaced lugs 30. The said supporting plate is formed on its front edge with a shoulder 31 and a laterally extending flange 32. The casing C fits against the shoulder 31 and is held against the same by set screws 33, the latter passing through slots 34 in a flange 35 on the casing and screwing into threaded openings in the flange 32 of the supporting plate. By virtue of this construction, the casing C and housing H are secured against bodily separation while the set screws 33 and slots 34 permit the casing to be rotated so as to move the pipe 24 to the position shown in dotted lines in Figure 6. The air which is to be heated and directed against the windshield is, in this embodiment, drawn into the fan casing through an inlet opening 36 which is formed in the supporting plate 29. This has the advantage that the air is preheated to some extent by the motor as it passes between the latter and the casing C.

The fan casing is adapted, as it is moved to operative or inoperative positions, to connect the heating element 26 to, or disconnect it from power. For this purpose, a stationary contact 37 is carried by the motor housing. This contact member is in the path traversed by a resilient contact finger 38 which is secured to but insulated from, the pipe 24 of the fan casing, the other end of the heating element being grounded to the said pipe. The contact member 37 and resilient contact finger 38 are so arranged that when the fan casing is in a position to direct air against the windshield behind the wiper, they co-operate in the manner shown in Figure 5, that is to say, to close a circuit through the heating element. As the fan casing is moved toward an inoperative position, the contact finger is carried by the pipe 24 out of engagement with the contact member 37 and the heating element is disconnected from power.

In this arrangement the heating element and motor may be connected in parallel so that during cold weather when the temperature is below freezing the fan casing may remain in an operative position with the contact finger 38 engaging the contact member 37. Thus, when the motor switch (not shown) is closed the heating element will also be connected to power. During warm weather when there is no necessity for heating the windshield, the fan casing may be moved to the position shown in dotted lines in Figure 6, in which position the contact finger 38 will be out of engagement with the contact member 37. When moved to this position the contact finger 38 co-operates with a projection 39 formed on the motor housing to latch the casing against movement. Thus, when the motor switch is closed the motor will be connected to power and hence operate the wiper, the heating element remaining disconnected from power.

The adjustability of the fan casing has the further advantage that it may be moved at will to change the direction of the heated current of air if such change in direction is desirable. This adjustable feature may also be availed of in the installation of the unit. Inasmuch as the direction of the heated current of air may be varied the position at which the wiper is installed with reference to the windshield may vary to meet different installation requirements without impairing to a substantial degree the efficiency, or manner of operation, of the air current creating and heating mechanism. When employed in such a manner, the heating element 26 may be connected to power in the manner shown in Figure 2, where it is not necessary or desired to lock the casing in its operative position.

We claim as our invention:—

1. A clear vision device for a windshield, including a windshield wiper, an electric motor for operating said wiper, a housing for said motor, a fan casing carried by said housing, a fan in said casing adapted to create a current of air, said casing being formed to direct the current of air directly against that portion of the said windshield which is traversed by the wiper, an electric resistance element in said casing for heating said current of air, means connecting said motor and said wiper whereby the latter is oscillated by said motor and connecting means between said motor and said fan whereby said fan is rotated continuously in the same direction during the oscillations of said wiper.

2. A clear vision device for a windshield, including a windshield wiper, an electric motor for operating said wiper, a housing for said motor, a fan casing carried by said housing, a fan in said casing operated by said motor and adapted to create a current of air, said casing being formed with an outlet pipe for directing the current of air directly against that portion of the windshield which is traversed by the wiper, said outlet pipe extending behind said windshield when in use and means for heating said air, said casing being adjustable so as to enable movement of the pipe away from the line of vision when not in use.

3. A clear vision device for a windshield, including a windshield wiper, an electric motor for operating said wiper, a housing for said motor, a fan casing carried by the said housing, a fan in said casing operatively connected to said motor and adapted to create a current of air, a pipe carried by said casing for directing the current of air directly against that portion of the windshield which is traversed by said wiper and a resistance element in said pipe for heating the said current of air, said casing being adjustable to enable its movement away from the line of vision when not in use.

4. In a clear vision device for a windshield, the combination with a windshield wiper and an electric motor for operating said wiper, of a fan casing carried by the housing of said motor, a fan in said casing mounted upon the armature shaft of said motor and adapted to create a current of air, said casing being formed to direct the current of air against that portion of the windshield which is traversed by said wiper, a resistance element for heating the said current of air, said casing being angularly adjustable with respect to said motor housing and cooperating contact members carried by said housing and casing, whereby the circuit through the said resistance element may be made or broken by angular movement of said casing relative to said housing.

5. In a clear vision device for a windshield, the combination with a windshield wiper and an electric motor for operating said wiper, of a housing for said motor, a fan casing carried by the said housing, said casing being spaced from said housing and formed with an inlet opening in the side adjacent said motor housing, a fan in said casing operatively connected to said motor and adapted to create a current of air, means carried by said casing for directing the current of air against that portion of the windshield which is traversed by said wiper and means for heating said current of air.

6. In a clear vision device for a windshield, the combination with a windshield wiper and an electric motor for operating said wiper, of a housing for said motor, a fan casing carried by the said housing, said casing being spaced from said housing and formed with an inlet opening in the side adjacent said motor housing, a fan in said casing operatively connected to said motor and adapted to create a current of air, a pipe carried by said casing for directing said current of air against that portion of the windshield which is traversed by said wiper and means for heating said current of air, said casing being angularly adjustable relative to said motor housing whereby said pipe may be adjusted to direct the current of air in the desired direction and to enable movement of the pipe away from the line of vision.

7. In a clear vision device for a windshield, the combination with a windshield wiper and an electric motor for operating said wiper, of a fan casing carried by the housing of said motor, a fan in said casing operated by said motor and adapted to create a current of air, a pipe carried by said casing for directing the current of air against that portion of the windshield which is traversed by said wiper, a resistance element in said pipe for heating said current of air, said casing being angularly adjustable relative to said motor housing, a contact member carried by said motor housing, a latching member, and a contact finger carried by said casing and engageable with the contact member carried by said housing for closing the circuit through said resistance element, said finger being adapted to co-operate with said latching member to secure said casing in an inoperative position.

8. A clear vision device for a windshield including a unitary housing which is adapted to be located at one side of said windshield, an electric motor encased in said housing, a shaft mounted in said housing, a wiper carried by said shaft, said wiper being adapted to clear a determined part of said windshield, means connecting said motor with said shaft, whereby to operate said wiper, a chamber formed in said housing, said chamber having an air inlet and an air outlet, a fan in said chamber for drawing air in said inlet, means for connecting said fan to the shaft of said motor, a nozzle carried by said housing, said nozzle communicating with said outlet and being formed to direct said air against that part of the windshield which is cleared by said wiper and an electric resistance element for heating said air.

9. A clear vision device for a windshield comprising a unitary housing which is adapted to be supported at one side of said windshield, an electric motor encased in said housing, a shaft mounted in said housing, a wiper blade carried by said shaft, means connecting said shaft to said motor, whereby to oscillate said blade and clear a predetermined area of said windshield, a chamber formed in said housing, said chamber having an air inlet and an air outlet, a fan for drawing air in said chamber through said inlet, means for connecting said fan to said motor whereby to rotate said fan continuously in the same direction during oscillations of said wiper blade, a nozzle carried by said housing, said nozzle communicating with the outlet of said chamber and being adapted to direct said air only against that area of said windshield which is traversed by said wiper blades and an electrical resistance element in said housing, said element heating said air as it moves toward said windshield, whereby to warm that portion of the windshield which is traversed by said wiper blade and prevent the accumulation thereon of frozen matter.

10. A clear vision device for a windshield comprising a unitary housing which is adapted to be supported at the upper side of said windshield, an electric motor encased in said housing, a shaft mounted in said housing, a wiper blade carried by said shaft, means connecting said shaft to said motor, whereby to oscillate said blade and clear a predetermined area upon the outer side of said windshield, a chamber formed in said housing, said chamber having an air inlet and an air outlet, a fan for drawing air in said chamber through said inlet, means for connecting said fan to said motor whereby to rotate said fan continuously in the same direction during oscillations of said wiper blade, a nozzle carried by said casing and located adjacent the inner side of said windshield, said nozzle communicating with the outlet of said chamber and being adapted to direct downwardly the current of air created by said fan against the inner side of that part of the windshield which is traversed by said wiper blade, said nozzle being formed so as to confine said current of air substantially within the area of said part of the windshield and an electrical resistance element in said housing, said element heating said air as it moves toward the windshield whereby to warm that portion of the windshield which is traversed by said wiper blade and prevent the accumulation thereon of frozen matter.

EDWIN B. GARY.
EDWARD A. EBERT.